(12) United States Patent
Aizawa et al.

(10) Patent No.: US 6,571,023 B1
(45) Date of Patent: May 27, 2003

(54) IMAGE PROCESSING METHOD USING MULTIPLE IMAGES

(75) Inventors: Kiyoharu Aizawa, Tokyo (JP); Kazuya Kodama, Tokyo (JP)

(73) Assignee: The University of Tokyo, Tokyo (JP)

( * ) Notice: Subject to any disclaimer, the term of this patent is extended or adjusted under 35 U.S.C. 154(b) by 0 days.

(21) Appl. No.: 09/172,849

(22) Filed: Oct. 15, 1998

(30) Foreign Application Priority Data

Apr. 15, 1998 (JP) .......................................... 10-104786

(51) Int. Cl.$^7$ ................................................. G06K 9/32
(52) U.S. Cl. ...................................... 382/294; 382/312
(58) Field of Search .............................. 382/154, 284, 382/299, 300, 255, 294, 279, 312; 348/47, 48

(56) References Cited

U.S. PATENT DOCUMENTS 4,661,986 A * 4/1987 Adelson .................... 382/41
5,793,900 A * 8/1998 Nourbakhsh et al. ........ 382/263
5,864,360 A * 1/1999 Okauchi et al. .............. 348/47
5,917,936 A * 6/1999 Katto ......................... 382/154
6,249,616 B1 * 6/2001 Hashimoto .................. 382/284

* cited by examiner

*Primary Examiner*—Yon J. Couso
(74) *Attorney, Agent, or Firm*—Venable; Robert J. Frank; Ashley J. Wells

(57) ABSTRACT

An image processing method using multiple images includes the steps of imaging multiple differently focused images $I_m$ (m=1, . . . , n); deriving an identical equation based on superposition models realized between the multiple differently focused images $I_m$ and desired images I, obtaining a solution by substituting multiple images $I_m$ and the functions $T_{mk}$ and $T_k$ of different focusing into the identical equation; performing an image process for generating desired image I based on this solution; and selectively generating a desired image I by controlling the function $T_k$.

2 Claims, 2 Drawing Sheets

FIG._2
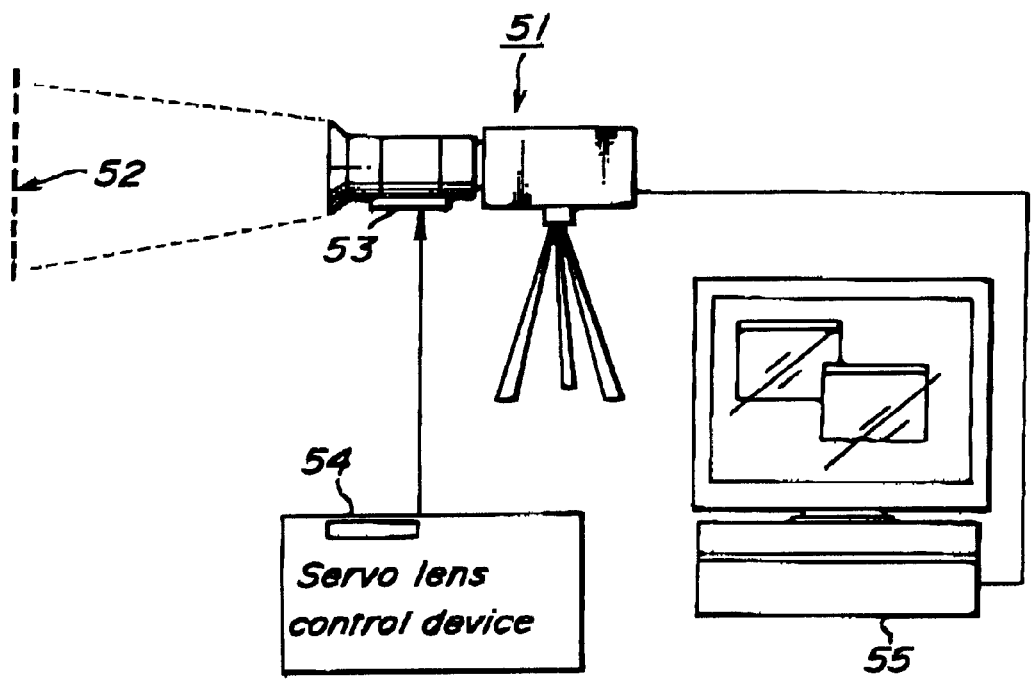

IMAGE PROCESSING METHOD USING MULTIPLE IMAGES

BACKGROUND OF THE INVENTION

1. Field of the Invention

The present invention relates to a camera device to which multiple differently focused images can be imaged at the same time, and an image processing method in which the desired image is generated from multiple differently focused images.

2. Related Art Statement

As a conventional example of the image for generating desired image or picture from multiple images, for example, there is an image-processing device based on the region division. In this conventional image processing method, for example, multiple different focused images are prepared, the focused region is judged respectively in respective images, the desired image is generated by performing a series of processing by which a fixed visual effect is given to each region by dividing the region of the multiple image based on the judgment result. In that case, it is general to use the image processing program which describes the procedure to process the above region decision, the region division, and the visual effect successively, Moreover, as a conventional example of the camera device used to image the multiple images used for the above image processing method, there is for example a usual imaging lens control type camera device 51 shown in FIG. 2. This camera device 51 is constituted as a camera device, which has one optical system. In order to obtain multiple images which are imaged by different focusing for the same scene (for example, scene 52 of FIG. 2) by using conventional camera device 51. It is necessary to perform imaging of multiple times by changing focusing.

That is, when n kinds of images are imaged according to different focusing by using conventional camera device 51 shown in FIG. 2, a zoom lens 53 is controlled by the manual operation, or by servo lens controller 54 provided to outside of the camera, first of all, after the focusing of a zoom lens 53 is controlled to focus on the first depth, the first image is acquired, next, after the focusing of the zoom lens 53 is controlled to focus on the second depth, the second image is acquired, and similarly after the focusing of the zoom lens 53 is controlled to focus on n depth, the nth image is acquired. Thus, the focusing and the imaging of n times are needed to acquire the image focused on n kinds of depth. Moreover, the imaged picture is forwarded from CCD not shown in the figure to a workstation 55, and will be supplied to the image processing.

Since the above conventional image processing method uses the decision condition "Focused region", when the region which has the even brightness value in the imaging subject scene and the region with the depth change are existent, the judgment precision of the region decision cannot be secured enough about those regions. Therefore, the above application range of the conventional image processing method is limited to a sharpening of the image etc. according to the integrated focused regions, so that the extension into more functional image processing is extremely difficult, such as the focus blur is arbitrarily adjusted every region and a stereoscopic image etc. is given, thereby generating the pseudo disparity.

Moreover, as long as the above conventional camera device in which the system of controlling the zoom lens from the outside is adopted, it is necessary to repeat the imaging by one imaging section every depth to be focused. Multiple images with different focusing cannot fundamentally be imaged to the dynamically changed imaging subject at the same time, so that it is not possible to use for the imaging of moving scene, and thus the application is limited only to the still image.

In addition, the zoom lens generally used as an imaging lens has an extremely complex control structure using the multiple lenses itself, if focusing is adjusted from the outside, it is not avoided that the optical center of an internal lens group which is the effective view position (main point) changes into back and forth direction of an optical axis. Therefore, when focusing is adjusted, three dimensional conditions will also be added, for example, a phenomenon is caused since an object in the back plain covered with a front object in the picture imaged in a certain condition, appears newly in the scene because of moved view point and in another image and thus imaged. As a result, the requirement "The imaged subject (object etc.) is same, except for the magnification change at the entire image among images in which the same scene is imaged, even in the change of focusing" can not be met, so that as for the image generated by the image processing, deterioration in picture quality which originates in the above phenomenon is not avoided by using the imaged picture or image.

SUMMARY OF THE INVENTION

The first object of the present invention is to provide a camera device in which multiple differently focused images can be imaged at the same time.

The second object of the present invention is to provide an image processing method in which the desired image is generated from multiple differently focused images.

To this first end, according to the present invention, there is provided a camera device for multiple pictures imaging types comprising an imaging lens mechanism; a prism means having an incident surface for receiving a light emanated from the imaging lens mechanism, and n output surfaces for emitting distributed light by dividing the incident light into n multiple equal parts (n=2,3 . . . ), respectively; n imaging sections for imaging the distributed light emitted from the n output surfaces of the prism means, respectively; a focusing control mechanism for adjusting a positional relation between the n output surfaces and the corresponding imaging sections, respectively; and a synchronizing means for synchronizing a timing of the imaging by the n imaging sections; whereby multiple images may be imaged by different focussing, simultaneously.

To this second end, according to the present invention, there is provided an image processing method using multiple images comprising steps of: imaging multiple differently focused images $I_m$ (m=1, . . . , n); deriving a following identical equation based on the superposition models realized between the different multiple focusing images Im and desired images I;

$$f(T_1, \ldots, T_k, T_{11}, \ldots, T_{1n}, T_{21}, \ldots, T_{2n}, T_{m1}, \ldots, T_{mk}, T_{n1}, \ldots, T_{nn}, I, I_1, \ldots, I_n) = 0 \quad (1)$$

where, n=2, 3, . . . , k=1, . . . , n and m=1, . . . , n, $T_{mk}$ is a function showing convolution according to blur function decided from camera property and camera parameter, and $T_k$ is a function specified by a user showing a convolution according to blur function in the image and showing an amount of parallel movement corresponding to disparity;

obtaining a solution by substituting multiple images $I_m$ and the functions $T_{mk}$ and $T_k$ of different focusing into the identical equation;

performing an image processing for generating desired image I based on this solution; and selectively generating a desired image I by controlling the function $T_k$ to obtain one of (a) any one of various images which contain a full focused image in which a full region of the image is sharpened, (b) an arbitrary focused image in which sharpness was adjusted every depth, (c) an image with disparity for binocular vision in which disparity is given, (d) an arbitrary focused image with disparity for binocular vision in which disparity is given to the arbitrary focused image, (e) a partially emphasized image in which only a specific region is emphasized, or (f) a partially extracted image in which only a specific region is extracted.

According to the present invention, as a preprocessing of encoding, a blooming control is preformed on depth direction every different region.

According to the present invention, the light emitted from the imaging lens mechanism enters into an incident plane of the prism means, thereby becoming multiple n (n=2, 3, . . . ) distributed lights divided equally. These multiple distributed lights enamate from n output planes of the prism means, respectively, thereby being imaged on n imaging sections, respectively. In that case, since the positional relation between the n output planes and the corresponding imaging sections is adjusted respectively with the focusing control mechanism, and the imaging according to the n imaging sections is synchronously performed by the synchronous means, so that multiple differently focused images can be imaged at the same time.

The different multiple images of focusing obtained by this imaging meet the requirement "The imaged subject (object etc.) is same, except for the magnification change at the entire image among images in which the same scene is imaged, even in the change of focusing", and can be used to process the image to aim at the generation or the like of a stereoscopic image. Moreover, multiple images of different focusing according to the above imaging are obtained at the same time, so that multiple images can correspond dynamically also in case of changing the subject (moving image etc.).

According to the present invention, each of multiple images of different focusing and the desired image to be generated are shown as superposition $I_m$ (m 1, . . . , n) and 1, so that the identical equation (1) approved immediately between the multiple images and the desired image and based on the superposition model, is led, and thus desired image I can be generated with the image processing. In this case, the element depending on the region division which is a common element to the multiple images and the desired image, is deleted from the above identical equation, so that the malfunction, for which the judgement precision of the region judgement as the above conventional example cannot be secured, is not caused, and thus the malfunction, from which the range of application of the image processing method is limited to the sharpening of the image etc., is not caused either.

According to the present invention, since the above identical equation, by which the relation approved immediately between multiple images and desired images is shown, can be applied to various images, so that a control of the function $T_k$, as a desired image I, generates selectively any one of various images which contain a full focused image in which a full region of the image is sharpened, an arbitrary focused image in which sharpness was adjusted every depth, an image with disparity for binocular vision in which disparity is given, an arbitrary focused image with disparity for binocular vision in which disparity is given to the arbitrary focused image, a partially emphasized image in which only specific region is emphasized, and a partially extracted image in which only a specific region is extracted. (For example, if the function $T_k$ is adjusted to achieve the effect of the high pass filter, the partial emphasized image to emphasize only a specific region is obtained, if the function $T_k$ is adjusted to achieve the effect of the phase shift filter, the image with disparity for the binocular vision with given disparity is obtained, and if the function $T_k$ is adjusted to achieve the effect of full zero filter on an unnecessary region, the partial extraction image, in which only a specific region is extracted, is obtained.)

According to the present invention, it is preferable to perform an adaptive image compression (for example, low rate encoding) in each region, since the adjustment, by which the focus blur is emphasized or is controlled in the direction of depth in each different region, is performed as a preprocessing of encoding.

BRIEF DESCRIPTION OF THE DRAWINGS

FIG. 2 shows the camera device used to image the multiple images used for the conventional image processing method.

DETAILED DESCRIPTION OF THE PREFERRED EMBODIMENT

Figure 1:
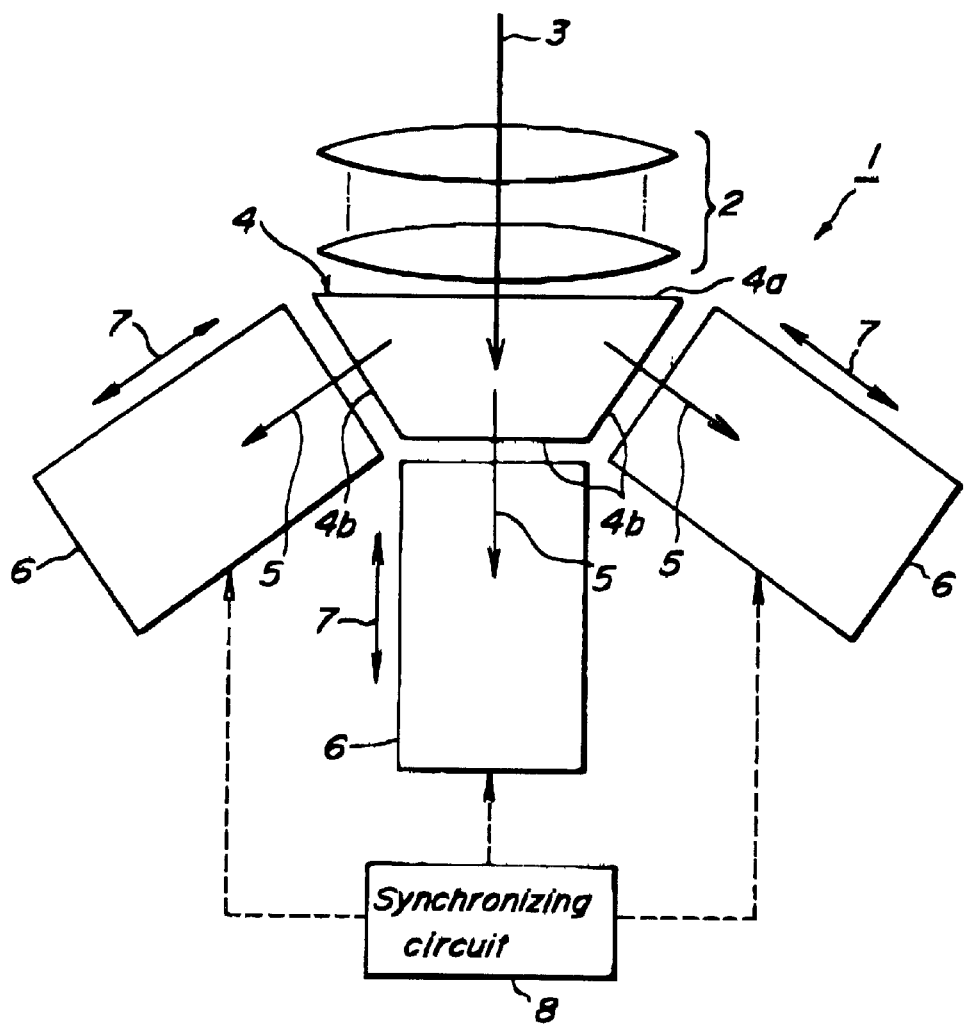
FIG. 1 shows a fundamental constitution of the multiple image simultaneous imaging type camera device for use in carrying out an image processing method using multiple images according to the present invention.

Hereafter, the embodiment of the present invention is explained in detail based on the drawing. FIG. 1 shows a fundamental constitution of the multiple image simultaneous imaging type camera device for use in carrying out an image processing method using multiple images according to the present invention. A camera device for multiple pictures simultaneous imaging types (hereinafter, refer to as only camera device) 1 in this embodiment comprises an imaging lens mechanism 2; a prism means 4 having one incident surface 4a for receiving a light 3 emanated from the imaging lens mechanism 2, and 3 output surfaces 4b for emitting distributed light 5 by dividing power of the incident light 3 into 3 equal parts, respectively; 3 imaging sections 6 for imaging the distributed light 5 emitted from the 3 output surfaces 4b of the prism means 4, respectively; a focusing control mechanism 7 for adjusting a positional relation among the 3 output surfaces 4b and the corresponding imaging sections 6, respectively; and a synchronizing means 8 for synchronizing a timing of the imaging by 3 imaging sections 6.

It is preferable to use for example an existing zoom lens mechanism in order to be able to adjust various field angle about the picture to be imaged as above described imaging lens mechanism 2. In this case, the incident light 3 from the imaging subject scene not shown is lead to the prism means 4 after the field angle is adjusted, when the lens group constituting the zoom lens mechanism 2 is passed.

Above-mentioned prism means 4 divides light 3 led from the imaging lens mechanism 2 multiple n (n=2,3, . . . ) equally by distributing the power of the light, and for example utilizes a three directional optical distribution prism which is generally used to distribute light shown in FIG. 1.

The light 3 taken from the imaging lens mechanism 2 by the optical distribution function of the prism means 4 emits to multiple (in this case, 3) imaging sections 6 after power distribution, so that each imaging section 6 takes similar distributed light 5.

Moreover, in the camera device 1 shown in FIG. 1, the prism means 4 is used as one stage, the prism means is connected as multi stages. In this case, the number of sheets of the picture to be imaged can be increased by similarly emitting the distributed light to more imaging sections.

The one that the lens portion was removed from "thumb sized camera" for example used in general is used as above imaging section 6. Moreover, as above focusing control mechanism 7, it only may be a mechanism capable of forming the movable focus plane, and may be used as a manual stage for example, by moving the focus plane in the direction of an optical axis of distributed light 5 back and forth.

In above imaging section 6, each focusing is adjusted independently, by moving the focus plane (receiving optical plane of the imaging element such as CCD) to distributed light 5 emitted from prism means 4 back and forth in the direction of an optical axis with focusing adjustment mechanism 7. Therefore, each imaging section 6 can image the picture that only focusing is different compared with the same imaging subject scene quite at the same time based on a synchronous signal from the synchronous circuit 8.

First of all, when using above camera device 1 performs the imaging of multiple images, the field angle is adjusted by controlling the imaging lens mechanism 2. Next, the positional relation between the output surface 4b of the prism means 4 and the corresponding imaging section 6 is independently adjusted respectively by moving respective imaging sections 6 back and forth in the direction of an optical axis with the use of the focusing adjustment mechanism 7, thereby obtaining the state that each imaging section 6 is focused on different desired depth severally. In this state, using an image record device not shown which has been connected to respective imaging sections 6 performs the imaging actually. In that case, a synchronous signal is inputted from the synchronous circuit 8 to the image record device connected with each imaging section 6, and three imaging sections 6 image the same imaging subject scene independently and simultaneously, so that multiple differently focused images can be imaged at the same time. Therefore, even if the imaging subject scene changes dynamically, the image of continuously different focusing can be imaged as animation or moving picture.

The different multiple images of focusing obtained by the imaging meet the requirement "The imaged subject (object etc.) Is same, except for the magnification change at the entire image among images in which the same scene is imaged, even in the change of focusing", so that multiple this execution form images aiming at the generation of the stereoscopic image etc. can be used for image processing.

Next, the image processing method using multiple this embodiment is explained. Moreover, it is preferable to use one imaged with the use of above camera device I as "Multiple differently focused images" used to execute this image processing method, but the image processing method of this embodiment can be applied also to "Multiple differently focused images" imaged by other camera devices, In the image processing method of this embodiment, the imaging subject scene is regarded as the layered structure of multiple pieces n (n=2,3, . . . ) of the image, and n images divided in the region of each depth are shown as $i_k$ (k=1, . . . , n), so that this image is used and superimposition $I_m$ (m=1, . . . , n) of the image group obtained by focusing this image on respective depths is shown as follows, The $I_m$ is multiple differently focused images.

Formula 1

$$I_m = \sum_{k=1}^{n} T_{mk} i_k \quad (m = 1, \ldots, n) \qquad (2)$$

Similarly, the desired image I to be generated is regarded as the layered structure of multiple images and is shown as follows.

Formula 2

$$I = \sum_{k=1}^{n} T_k i_k \qquad (3)$$

In the above expressions (2) and (3), $T_{mk}$, is a function showing the convolution according to the blur function decided from the camera property and the camera parameter, and $T_k$ is a function, k=1, . . . , n showing a convolution according to the blur function in the image and an amount of parallel movement corresponding to disparity specified by user.

The following relational expressions are derived between multiple images $I_m$ of different focusing and desired image I by deleting $T_k$ from the above expressions (2) and (3).

$$f(T_1, \ldots, T_k, T_{11}, \ldots, T_{1n}, T_{21}, \ldots, T_{2n}, T_{m1}, \ldots, T_{mk}, T_{n1}, \ldots, T_{nn}, I, I_1, \ldots, I_n) = 0 \qquad (1)$$

The expression (1) becomes an identical equation approved between multiple images $I_m$ and desired image I of different focusing and based on the superposition model, so that when desired function $T_k$ specified by the user, function $T_{mk}$ decided from the camera property and the camera parameter and multiple images $I_m$ are substituted to the expression (1), only desired image I becomes an unknown number. Therefore, desired image I can be generated with the image processing by solving the expression (1). Moreover, desired image I is generated by solving the above expression (1) directly, but it is more preferable to make the above expression (1) solved repeatedly.

In that case, element $i_k$, depending on the region division which is a common element to multiple images $I_m$ and desired image I, is deleted from the expression (1), and desired image I is generated immediately without using the region division, so that the malfunction, for which the judgment precision of the region judgment as the above conventional example cannot be secured, is not caused. Therefore, the application range of the image processing method of this embodiment does not limit to the sharpening etc. of the image, and become various as follows.

That is, the above identical equation (1) shows the relation approved between multiple images $I_m$ and desired image I, and can be applied to various images, so that in case of performing the image processing in each region where the object etc. exist (including the image processing in each region corresponding to respective depths and in each region where the object etc. exist), the user specifies a supplementary region where a rectangular region encircling the object etc. which become subjects of the image processing beforehand, is specified, and only may control the function $T_k$ showing the blur function according to the desire. The image processing in each region which includes an individual object etc. becomes possible by the adjustment, and a long time need not be put with human hand as the above conventional example and be perform work to cut out the said region.

A control of the function $T_k$, as a desired image I, may generate selectively any one of various images which contain a full focused image in which a full region of the image is sharpened, an arbitrary focused image in which sharpness was adjusted every depth, an image with disparity for binocular vision in which disparity is given, an arbitrary focused image with disparity for binocular vision in which disparity is given to the arbitrary focused image, a partially emphasized image in which only a specific region is emphasized, and a partially extracted image in which only a specific region is extracted. Particularly, while independently emphasizing or controlling the blur of the distant view or the near view, an arbitrarily focused image with disparity for binocular vision being an image with the disparity of each depth can be generated only after the image processing method of this embodiment is used, and thus the effectiveness of the image processing method is proven.

For example, if the adjustment of the function $T_k$ is performed for full region which includes the object etc. so as to achieve the effect of the filter focusing on the object or the like in a certain region, the sharpened full focus image can be obtained. Sharpening process according to the image processing method of this embodiment is effective, in case of obtaining high definition image. Moreover, if the function $T_k$ is adjusted in such a manner that the effect of the filter adjusting the sharpness of the objects in each region divided in the direction of depth which includes the object etc. (focus), the arbitrarily focused image can obtained. If the function $T_k$ is adjusted to achieve the effect of the phase shift filter in each region, which includes the object etc., the image with disparity for the binocular vision with disparity can be obtained. If the function $T_k$ is adjusted to achieve the effect in the filter adjusting the sharpness of the objects in each region divided into the direction of depth which includes the object etc. and the effect of the phase shift filter, the arbitrarily focused image with disparity can be obtained. If the function $T_k$ is adjusted for a specific region to achieve the effect of the high pass filter, the partial emphasized image to emphasize only a specific region can be obtained. If the function $T_k$ is adjusted for an unnecessary region to achieve the effect of full zero filters, the partial extraction image, in which only a specific region is extracted, can be obtained.

Moreover, as a preprocessing of encoding, if an adaptive image compression (for example low rate encoding) in each region is performed, it is effective to perform the adjustment by which the focus blur is emphasized or is suppressed in the direction of depth in each different region.

As described above, according to multiple simultaneous imaging type camera devices of the present invention, incident light is distributed from the imaging lens mechanism to multiple n(n=2,3, . . . ) with the use of the prism means, multiple differently focused images can have been synchronously imaged, the focusing control is performed by the focusing control mechanism at respective imaging sections of n pieces, and the gap according to the magnification change in each depth as above conventional example is not caused between multiple thus obtained differently focused images. Therefore, the image processing is performed by using multiple images obtained by different focusing with the use of the multiple simultaneous imaging type camera devices of the present invention, so that an excellent image without the picture quality deterioration according to the above gap can be generated, and thus the image processing and the subject to aim at the generation of the stereoscopic image etc. can correspond dynamically also in case of the change (moving image etc.).

Moreover, according to the image processing method using multiple images of present invention, by substituting $I_m$, $T_{mk}$, and $T_k$ to the identical equation (1) approved immediately, to multiple differently focused images $I_m$ (m=1, . . . , n) and based on the superposition model and desired images I, and by solving it, desired image I, in which the focus blur and the disparity etc. of each depth region are adjusted, can be generated with the image processing immediately without using the region segmentation. In this case, the element depending on the region segmentation which is a common element to the multiple images and desired images, is deleted from the above identical equation, so that the malfunction, for which the judgment precision of the region judgment cannot be secured, is not caused as in the conventional example. Therefore, the range of application of the image processing method of the present invention is not limited to the sharpening of the image, so that high degree and various image generation processing becomes possible.

For example, the adjustment of the function $T_k$ in the above identical equation, the desired image of various images (a full focused image in which a full region of the image is sharpened, an arbitrary focused image in which sharpness was adjusted every depth, an image with disparity for binocular vision in which disparity is given, an arbitrary focused image with disparity for binocular vision in which disparity is given to the arbitrary focused image, a partially emphasized image in which only a specific region is emphasized, and a partially extracted image in which only a specific region is extracted,) can be generated.

What is claimed is:

1. An image processing method using multiple images, comprising the steps of:

imaging multiple differently focused images $I_m$ (m=1, . . . , n);

deriving an identical equation based on superposition models realized between the multiple differently focused images $I_m$ and desired images I as follows;

$$f(T_1, \ldots, T_k, T_{11}, \ldots T_{1n}, T_{21}, \ldots, T_{2n}, T_{m1}, \ldots, T_{mk}, T_{n1}, \ldots, T_{nn}, I, I_1, \ldots, I_n) = 0 \quad (1)$$

where n=2, 3. . . , k=1, . . . , n, and m=1, . . . , n, $T_{mk}$ is a function showing convolution according to blur function decided from camera property and camera parameter, and $T_k$ is a function specified by a user showing a convolution according to blur function in the image and showing an amount of parallel movement corresponding to disparity;

obtaining a solution by substituting multiple differently focused images $I_m$ and the functions $T_{mk}$ and $T_k$ of different focusing into the identical equation;

performing an image process for generating desired image I based on this solution; and selectively generating a desired image I by controlling the function $T_k$ to obtain one of (a) any one of various images which contain a full focused image in which a full region of the image is sharpened, (b) an arbitrary focused image in which sharpness is adjusted for every depth, (c) an image with disparity for binocular vision in which disparity is given, (d) an arbitrary focused image with disparity for binocular vision in which disparity is given to the arbitrary focused image, (e) a partially emphasized image in which only a specific region is emphasized, or (f) a partially extracted image in which only a specific region is extracted.

2. The image processing method using multiple images as claimed in claim 1, further comprising performing a blurring control in a depth direction in every different region as a preprocessing of encoding.

* * * * *